July 2, 1968   E. B. HEFT ET AL   3,391,357
ELECTRIC CIRCUIT BREAKER WITH HIGH SPEED TRIP DEVICE
Original Filed Sept. 30, 1965   6 Sheets-Sheet 1

FIG. 1

INVENTOR.
ELDON B. HEFT,
JOSEPH F. JOHNSON
BY Robert T. Casey
ATTORNEY

FIG.2

July 2, 1968    E. B. HEFT ET AL    3,391,357
ELECTRIC CIRCUIT BREAKER WITH HIGH SPEED TRIP DEVICE
Original Filed Sept. 30, 1965    6 Sheets-Sheet 3

INVENTORS
ELDON B. HEFT,
JOSEPH F. JOHNSON
BY Robert F. Casey
ATTORNEY

July 2, 1968   E. B. HEFT ET AL   3,391,357
ELECTRIC CIRCUIT BREAKER WITH HIGH SPEED TRIP DEVICE
Original Filed Sept. 30, 1965   6 Sheets-Sheet 4

INVENTORS
ELDON B. HEFT,
JOSEPH F. JOHNSON
BY Robert F. Casey
ATTORNEY

July 2, 1968  E. B. HEFT ET AL  3,391,357
ELECTRIC CIRCUIT BREAKER WITH HIGH SPEED TRIP DEVICE
Original Filed Sept. 30, 1965  6 Sheets-Sheet 5

INVENTORS
ELDON B. HEFT,
JOSEPH F JOHNSON
BY Robert N. Casey
ATTORNEY 3,391,357
ELECTRIC CIRCUIT BREAKER WITH
HIGH SPEED TRIP DEVICE
Eldon B. Heft, West Hartford, and Joseph F. Johnson, Plainville, Conn., assignors to General Electric Company, a corporation of New York
Original application Sept. 30, 1965, Ser. No. 491,840, now Patent No. 3,315,189, dated Apr. 18, 1967. Divided and this application Oct. 7, 1966, Ser. No. 585,073
5 Claims. (Cl. 335—16)

ABSTRACT OF THE DISCLOSURE

An electric circuit breaker of the type including separable contacts and associated arc extinguishing means, together with manually and automatically operable mechanism for the contact and current responsive trip means for operating mechanism, is further provided with a high-speed magnetically operable trip device capable of acting on the contacts to open them in a shorter time than is required by tripping of the operating mechanism. The trip means for the mechanism is positioned between the arc interrupting means and the operating mechanism, and the high-speed trip device is positioned on the opposite side of the mechanism from the trip means.

This application is a division of our co-pending application Ser. No. 491,840, filed Sept. 30, 1965 now Patent No. 3,315,189, issued Apr. 18, 1967 and assigned to the same assignee as the present invention.

The present invention relates to electrical circuit breakers and, more particularly, to a novel manually and automatically operable circuit breaker assembly of the toggle type which may be manually operated to either the open or the closed position and which may be automatically operated to the tripped position in response to an overload in the circuit to which it is connected.

Increased capacity of electric power supply systems has created a demand for electric circuit breakers that are capable of interrupting a relatively high, short circuit currents and which are also capable of interrupting small but continuous overload currents. Generally, devices having rapid and effective means capable of such interruption have been of large size, costly, or difficult to fabricate.

It is an object of the present invention to provide an automatic contact operating mechanism that may be actuated without a corresponding movement of the manual switching mechanism.

It is another object of this invention to provide a novel circuit breaker assembly that has a manually and automatically operable switching mechanism and has a second automatically operable switching mechanism that may be operated independently of the manual switching mechanism.

It is still another object of this invention to provide such a circuit breaker having an automatic switching mechanism which has a releasable toggle linkage for tripping the circuit breaker upon relatively small, continuous overloads.

It is yet another object of this invention to provide such a circuit breaker having an automatic switching mechanism for tripping the circuit breaker upon the occurrence of sudden high short circuit currents without moving the manual switching mechanism.

Other objects and advantages will be readily apparent from the following detailed specification and the appended claims.

It has now been found that the foregoing objects and other advantages can be readily attained in an electrical circuit interrupter having a support with a first contact thereon, and a contact-carrying member with a second contact thereon for electrical engagement with the first contact. A toggle linkage is mounted on the support and a current overload operating means is engaged with the contact-carrying member for moving this member and thereby the second contact relative to the first contact to the open circuit position automatically in response to an overload current. The current overload operating means including biasing means pivotally mounted on the toggle linkage and operable independently thereof and which is engaged with the contact-carrying member for biasing this member relative to the pivotal mounting of the toggle linkage. The toggle linkage is connected to the contact-carrying member for moving the contact-carrying member relative to the first contact and thereby the second contact into and out of electric engagement with the first contact to provide open and closed circuit positions.

In accordance with a highly advantageous construction for circuit breakers of this type, two generally parallel support members on the support extend upwardly therefrom and pivotably support a manually operable operating member and a releasable cradle. In one embodiment, a pair of upper toggle links are pivotably mounted at their upper ends to the cradle and, at their lower ends, to the upper ends of a pair of lower toggle links which are pivotably mounted at the lower ends on the support members. The upper and lower toggle links form a main toggle linkage which is biased into the desired position by a pair of tension springs which operate between the pair of upper links and the operating member.

The contact-carrying member or operating rod is slidably mounted on the support so that the contact attached thereto is free to move into and out of engagement with the spaced stationary contact. The contact-carrying member is biased relative to the toggle linkage therewith by the independently operable biasing means which includes a magnetically operable link which is pivoted on the lower toggle links and is slidably engaged with the contact-carrying member by means of a pin which is disposed in an elongated aperture in the magnetically operable link. A generally L-shaped link is pivoted at one end to the magnetically operable link and is biased by a pair of springs operating between the opposite end thereof and the support members. The pivots and fixed mounting for the springs are selected so that the magnetically operable link is normally biased against the lower link when the operating member is in the open or closed position. If so desired, the L-shaped link may be omitted from the biasing means and the springs connected to the magnetically operable link, but it affords an advantage in acting as an extension of the springs of the biasing means which allows the springs to operate freely without contacting other parts of the circuit breaker mechanism.

The circuit breaker may be operated manually by pivoting the operating member on the support members whereby the line of action of the pair of springs attached thereto is moved across the pivot point of the upper toggle links which causes the toggle linkage to buckle and move the magnetically operable link and the contact-carrying member to the open or closed position. The magnetically operable link is normally held in engagement with the lower toggle links by the bias of the springs of the biasing means when the operating member is moved as described above.

When a sudden high overload occurs, a solenoid on the support is actuated and magnetically acts upon the armature on the other end of the contact-carrying member to draw the contact-carrying member away from the fixed contact. As this movement toward the solenoid occurs, the magnetically operable link is pivoted about the lower link of the main toggle linkage until the line of action of the springs of the biasing means passes over the pivot point of the magnetically operable link. Thereafter, the contact operating rod is biased into the open position by the biasing means. Thus the springs of the biasing means function to bias the magnetically operable link and thereby the operating rod toward either the open or the closed circuit position relative to the toggle linkage depending on the position of the magnetic link. In this manner, the link of the biasing means may be pivoted on the main toggle linkage and may be actuated by the solenoid to bias the operating rod to the open or closed position relative to the toggle linkage without corresponding movement of the main toggle linkage and its operating member. The magnetically operable link and contact-carrying member may be reset into the closed position by any suitable resetting means.

In accordance with desirable practice, an additional automatic switching means utilizing a bimetallic strip is provided which is actuated by a small, continuous overload current to release the cradle which moves the pivot point of the upper toggle link across the line of action of the springs attached thereto causing the main toggle linkage to buckle and move the magnetic link and the contact-carrying member to the open circuit position. When it is desired to reset the mechanism, the operating member may be pivoted to rotate the cradle into engagement with a releasable latch member cooperating with the bimetallic strip so that the cradle is held in a fixed position.

Another embodiment of this invention utilizes a mechanism similar to that described hereinbefore but having a main toggle linkage which has an upper toggle link, a lower toggle link, and an intermediate toggle link connecting the upper and lower toggle links. The upper toggle link is biased by a spring attached to the operating member and the magnetically operable link is pivoted on the lower link and is biased into engagement with a shoulder portion of the lower link by the springs of the biasing means which operates between the magnetically operable link and the lower link at a point spaced from its pivot thereto.

When a sudden large short circuit current occurs, a solenoid acts upon an armature on the contact-carrying member to draw it toward the open circuit position and the magnetically operable link biases it toward this position as soon as the line of action of the springs passes over its pivot point. The intermediate link functions to prevent the main toggle linkage from being collapsed from the closed into the open position by the action of the solenoid in moving the contact-carrying member into its open circuit position. This occurs because the toggle linkage is constructed so that a force tending to rotate the lower link in a counterclockwise direction toward the open position causes the intermediate link to move upwardly and rotate the end of the upper link connected thereto in a counterclockwise direction; however, counterclockwise rotation of the upper link is prevented by a stop on the cradle so that the toggle linkage is positively prevented from buckling to the open position. Thus, the circuit breaker may be automatically operated to an open position on the occurrence of a sudden large short circuit current without a corresponding movement of the main toggle linkage and the toggle linkage substantially eliminates the likeihood of the solenoid producing a collapse thereof during its action upon the contact-carrying member.

In another embodiment of this invention, two pivot pins, one attached to a magnetically operable link and the other attached to the lower link of a main toggle linkage similar to that described imediately heretofore, are disposed in arcuate, elongated slots in the other link. These pins and elongated slots function as a sliding connection between the magnetically operable link and the toggle linkage and minimize the amount of friction involved in turning the magnetically operable link on the lower toggle link. Accordingly, by reducing the amount of friction involved in rotating the magnetically operable link, the opening magnetic force required from the solenoid is reduced with a consequent reduction in the tendency to move the toggle mechanism from the closed to the open position. This embodiment may be used as a pivotal mounting for either of the two toggle linkages described above.

In accordance with a preferred embodiment of this invention, a housing or support is provided with a line terminal, a load terminal and an arc-extinguishing channel having a plurality of arc-cooling plates. A pair of spaced stationary contacts are provided on one end of the housing for engagement with a movable or bridging contact member movably supported on the contact-carrying member within the housing. A solenoid is provided at the opposite end of the housing which has an armature on one end of the contact-operating member disposed therein for moving the contact-carrying member away from the spaced stationary contacts upon a sudden high overload current passing therethrough. A flexible cable connects the solenoid with the line terminal and another flexible cable connects the solenoid with one end of a current-conducting bar supported on the bottom wall of the housing. The opposite end of the current-conducting bar has a flexible cable connected to a bimetallic strip which is electrically connected to one of the fixed contacts. The bridging contact electrically connects with the pair of fixed contacts upon movement of the contact-carrying member and is in turn electrically connected to the load terminal.

For a more complete understanding of the present invention, reference should now be made to the following detailed specification and to the accompanying drawings wherein.

Referring first to FIGURES 1 through 9, an insulated housing or support generally designated by the numeral 10 has end walls 12 and 14, top and bottom walls 16 and 18 and side walls 19, one of the side walls 19 being removed to show the interior of the housing 10. A conducting bar 20 is retained in a recess in bottom wall 18 and two spaced apart, upwardly extending, generally parallel support members 22 and 24 are attached to bottom wall 18 and are positioned so that no contact is made with conducting bar 20. Pivotably supported on pivot pins 28 extending outwardly from the sides of support members 22 and 24 are the leg portions 27 of a generally U-shaped manual operating member or yoke generally designated by the numeral 26, and the shaft 32 rotatably mounts releasable cradle 30 between the support members 22 and 24.

Figure 1:
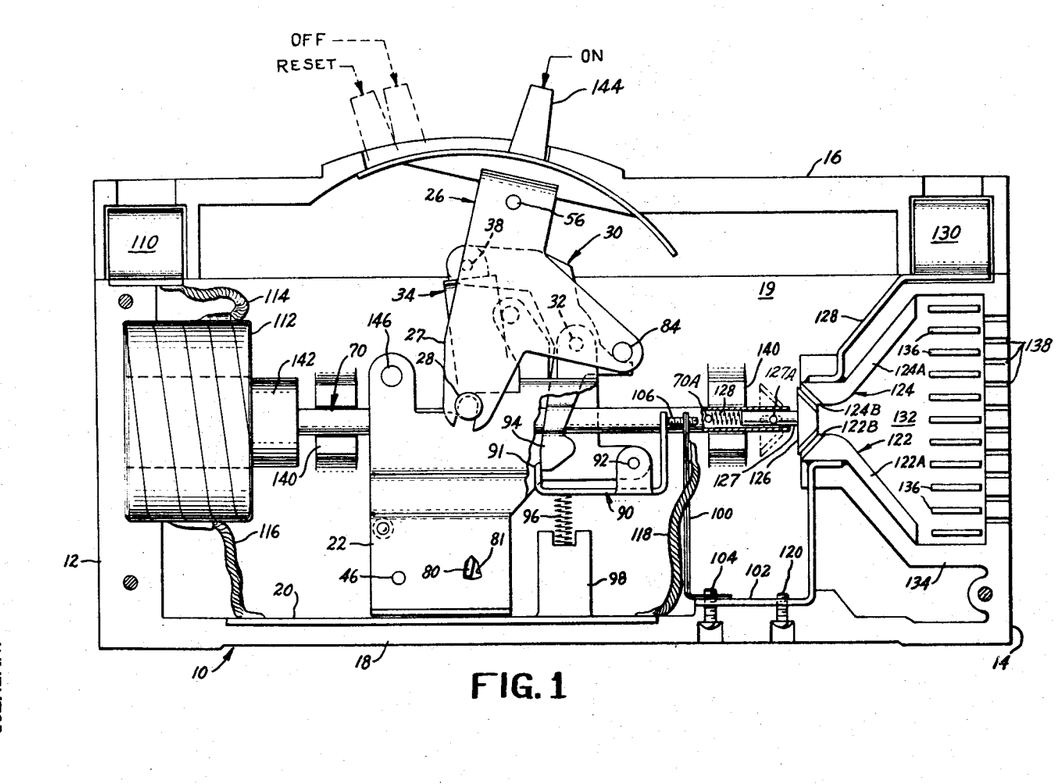
FIGURE 1 is a side elevation view of an electrical circuit breaker embodying the present invention with portions of the enclosing casing being removed to show internal construction and certain parts being broken away for clarity of illustration.
Figure 2:
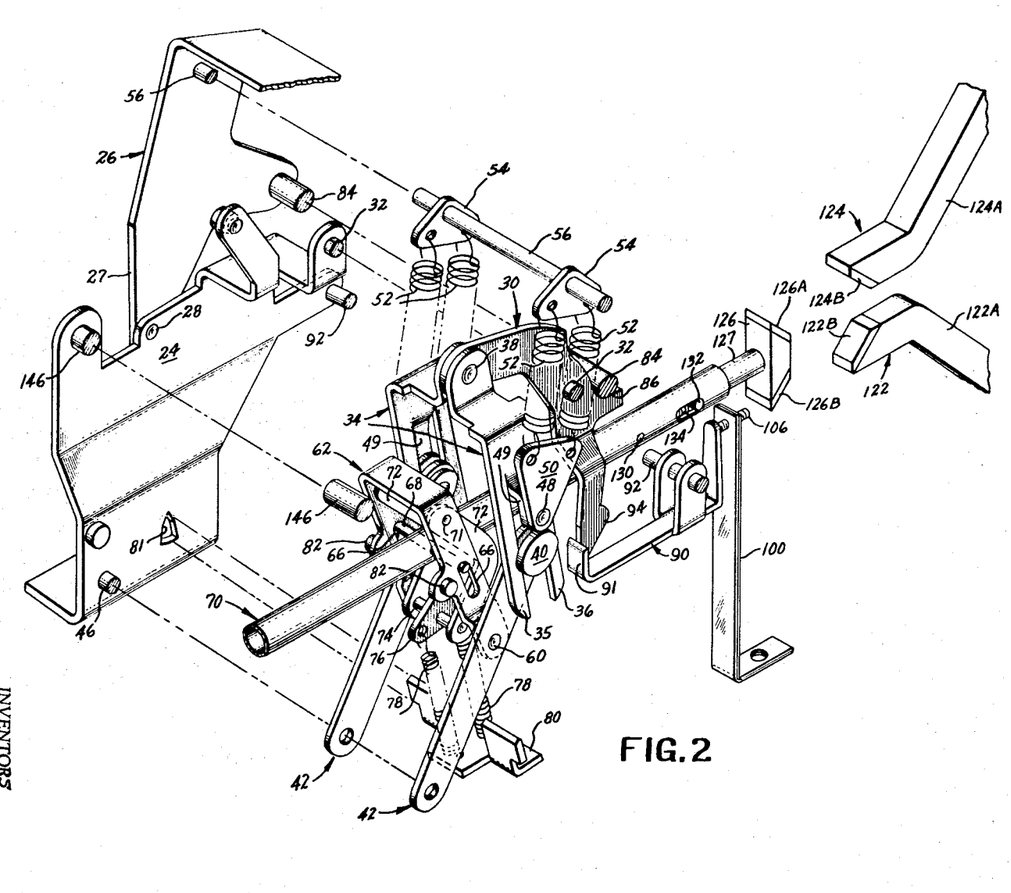
FIGURE 2 is a partially exploded perspective view to an enlarged scale of the toggle and automatic operating mechanisms and certain related parts of the circuit breaker of FIGURE 1 with some parts broken away for clarity of illustration.

A pair of toggle links 34 with a bifurcated end portion providing leg portions 35 and 36 are pivotally mounted at their other end by the pivot pin 38 to the upper end portion of the releasable cradle 30. In the slots between the leg portions 35 and 36 of the toggle links 34 are slidably carried pivot pins 40 having head portions larger than the slot, and which are mounted on the upper end of the pair of lower toggle links 42 which are pivotally supported at the lower ends on the shaft 46 which is seated in the support members 22 and 24. On outwardly projecting arm portions 49 of the toggle links 34 between the legs 35, 36 are pivot pins 48 which pivotably support a pair of triangular shaped members 50. A pair of main toggle springs 52 are connected at their lower end to each of the triangular members 50, and are attached on their upper ends to a second pair of triangular-shaped members 54 which are pivotally supported on the rod 56 which has its end portions seated in the leg portions 27 of the operating member 26. Thus, the bifurcated toggle links 34 and the lower toggle links 42 form a main toggle linkage which is biased by the two pairs of springs 52 into the desired position.

Pivotally engaged with the lower toggle links 42 and disposed therebetween is a generally U-shaped magnetically operable link generally designated by the numeral 62. The leg portions 64 (see FIGS. 4 and 6) of the link 62 are pivoted adjacent the ends thereof on the pivot pins 60 of the lower toggle links 42 and the link extends upwardly therefrom between the bifurcated toggle links 34. Slidably and pivotally mounted on the magnetically operable link 62 by the pin 68 which seats in elongated slots 66 in the leg portions 64 is the contact-carrying member or operating rod generally designated by the numeral 70

Pivotably mounted between the leg portions 64 and adjacent the base portion of the link 62 are a pair of generally L-shaped links 72 which have one leg mounted on the pivot rod 71 and which have a rod 74 extending between the opposite legs thereof. Pivotably supported on the rod 74 is a generally triangular-shaped member 76 to which one end of a pair of biasing springs 78 are attached, the opposite end thereof being attached to the mounting plate 80 which has arms pivotably seated in apertures 81 in the support members 22 and 24. Outwardly projecting lugs 82 on the legs 64 of the link 62 abut against the toggle links 42 when biased in that direction by the springs 78. If so desired, the springs 78 may be engaged with the rod 71 of the magnetically operable link 62 without the use of the L-shaped links 72 but these members afford the benefit of extending the operating length of the springs 78 and preventing contact with the other operating parts. This direct engagement is shown in the partially diagrammatic views of FIGURES 3–9 for clarity of illustration.

A bar 84 extends between the leg portions 27 of the U-shaped operating member 26 and abuts against a shoulder 86 on the cradle 30 which is normally held in the fixed position illustrated in FIGURES 1 and 2 by a releasable member or latch 90 pivoted on the shaft 92 which is mounted on the support members 22 and 24. As seen in FIGURE 1, the latch 90 has a shoulder portion 91 which is retained in contact with the extended leg portion 94 of the cradle 30 by the compression spring 96 which is seated on the support block 98 on the bottom wall 18 and spaced thereby from the conducting bar 20. The compression spring 96 biases the latch 90 in a clockwise direction about the shaft 92 as viewed in FIGURE 1 and thereby tends to move the shoulder portion 91 into contact with the extended end portion 94 of the cradle 30.

The releasable latch 90 may be automatically operated by an overload releasing means such as a current-responsive, thermally actuated, bimetallic strip 100 which will bend toward the releasable latch 90 upon the occurrence of a predetermined, continuous relatively small overload current condition. The bimetallic strip 100 is supported on and secured to the conducting bar 102 by a fastener 104 in the bottom wall 18 and an adjusting screw 106 is attached to the free end of the bimetallic strip 100 to abut against the latch 90 so that the mechanism may be set to operate at the desired level of overload current. When the bimetallic strip 100 is actuated by such an overload current and bends toward the latch 90, the spring 96 is compressed as the latch 90 is rotated in a counterclockwise direction as viewed in FIGURE 1 and the shoulder portion 91 is disengaged from the extended end portion 94 of the cradle 30.

An incoming line terminal 110 is supported on the housing 10 and is connected by the flexible cable 114 to the solenoid 112 which is supported on the end wall 12 and connected to one end of the conducting bar 20 by the flexible cable 116. Another flexible cable 118 connects the opposite side of conducting bar 20 to the bimetallic strip 100 which in turn is electrically connected to the conducting bar 102 which is supported on bottom wall 18 by screw 120. Supported within the insulating casing 10 adjacent the end wall 14 is a pair of stationary contact assemblies generally designated by the numerals 122 and 124 and having stationary contacts 122b and 124b and a main body portion including outwardly diverging arc-runner portions 122a and 124a.

On the end of the contact operating rod 70 adjacent the contact assemblies 122, 124 is a generally wedged-shaped movable bridging contact member 126 (see FIG. 2) which carries the movable contacts 126a and 126b cooperating with the stationary contacts 122b and 124b to complete a circuit therebetween when in contact therewith. A cylindrically-shaped rod 127 is disposed within a bore in the contact member 126 and carries the movable contact member 126 at its outer end. The rod 127 is biased outwardly by a compression spring 128 (see FIG. 1) operating against the pin 70A, carried by the rod 70 and the rod 127 is limited in its travel by the pin 127A, carried by the rod 127 which is slidably seated in a pair of elongated apertures 134 in the operating rod 70.

In the "on" condition of the circuit breaker, the spring 128 is slightly compressed by the inward movement of the rod 127 when the contact member 126 is in contact with stationary contact assemblies 122 and 124. This permits a small amount of pre-travel of the operating rod 70 in the opening direction before it picks up the pin 132 and the movable contact 126 thereby providing an impact or thrust opening action by allowing the operating rod 70 to achieve an initial momentum in the opening direction which is then transferred to the movable contact 126 with impact action.

The stationary contact assembly 124 is electrically connected to the load terminal 130 through the conducting bar 126. The current flow path through the circuit breaker is therefore as follows: from the line terminal 110 through the flexible cable 114 to the solenoid 112, thence through the flexible cable 116 to the conducting bar 20 and through the flexible cable 118 to the bimetallic strip 100; thence through the conducting bar 102 to stationary contact assembly 122; upon closing of the contacts, through movable contact member 126 to the stationary contact assembly 124 and thence through the conducting bar 128 to the load terminal 130.

In accordance with generally desirable practice, the stationary contact assemblies 122 and 124 are associated with an arc-extinguishing chamber 132 provided by the insulating barrier member 134 adjacent the end wall 14 which has a plurality of arc-cooling plates 136. The end wall 14 is provided with a plurality of outwardly extending slots 138 for cooling the arc chamber 132.

As seen in FIGURE 1, the elongated tubular operating rod 70 is slidably supported in brackets 140 on the side walls 19 outwardly of the toggle linkage so that contact member 126 may move freely towards and away from the stationary contact assemblies 122 and 124. On the end of the tubular operating rod 70 adjacent the solenoid 112 is an armature 142 which moves within the core aperture of the solenoid 112.

The circuit breaker device may be manually operated by the handle 144 which is attached to the manual operating member 26 and extends upwardly through the top wall 16 of housing 10. By moving the handle 144 in a counterclockwise direction from the "on" to the "off" position as viewed in FIGURE 1, the operating handle 144 is rotated on the pivot pins 28 and the rod 56 is thereby moved causing the line of action of the springs 52 to pass across the pivot pin 38 of the toggle links 34 and the toggle links 34 and 42 are buckled from the "on" position shown in FIGURE 3 to the "off" position shown in FIGURE 5. As the lower toggle links 42 move in the manner described above, they abut against the lugs of the magnetically operable link 62 and move the link 62 from the "on" position illustrated in FIGURE 4 to the "off" position illustrated in FIGURE 6. Since the magnetically operable link 62 is slidably engaged with the operating rod 70 through the pin 68 which is disposed in the elongated slots 66 thereof, the operating rod 70 and contact member 126 are moved from the "on" position illustrated in FIGURE 4 to the "off" position illustrated in FIGURE 6. The springs 78 bias the magnetically operable link 62 and the operating rod 70 into the "on" position as illustrated in FIGURE 4 and when the link 62 is in the "off" position illustrated in FIGURE 6, the springs 78 still tend to bias the contact rod 70 towards the "on" position.

Figure 3:
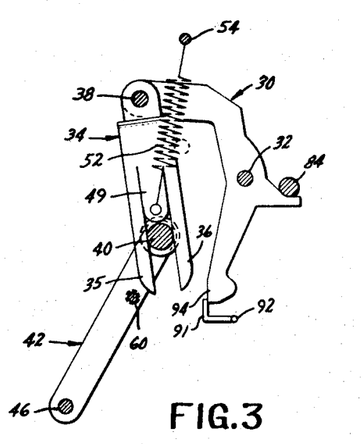
FIGURE 3 is a partially diagrammatical side elevational view of the cradle and main toggle linkage in the on position of the circuit breaker.
Figure 8:
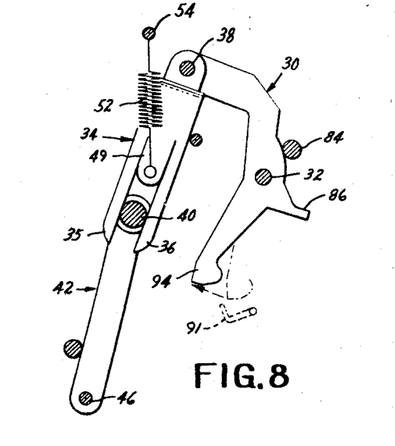
FIGURE 8 is a view similar to FIGURE 3 with the parts shown in the thermally tripped position of the circuit breaker.
Figure 9:
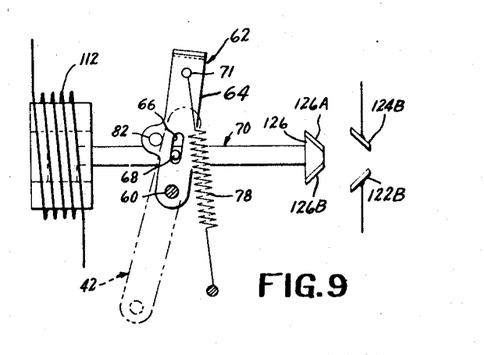
FIGURE 9 is a view similar to FIGURE 4 with the parts shown in the thermally tripped position of the circuit breaker.

When the bimetallic strip 100 is thermally actuated by a small, continuous overload current and bends to move the releasable latch 90 from engagement with extended end portion 94, the cradle 30 rotates in a clockwise direction from the "on" position illustrated in FIGURE 3 to the thermally-tripped position illustrated in FIGURE 8. As the cradle 30 rotates the ends of the bifurcated toggle links pivoted thereto are moved across the line of action of the spring 52 causing the toggle links 34 and 42 to buckle and assume the position illustrated in FIGURE 8. As the lower links 42 rotate, they abut against the pins 82 on the magnetically operable link 62 which rotates and slides the operating rod 70 from the "on" position illustrated in FIGURE 4 to the thermally tripped position illustrated in FIGURE 9. The cradle 30 may be reset by rotating the operating member 26 by the handle 144 in the counterclockwise direction as viewed in FIGURE 1 so that the bar 84 engages the cradle 90 and rotates it about the shaft 34 to cam the latch 90 against the spring 96 until the cradle 30 is again engaged and held in a fixed position by the latch 90.

Figure 4:
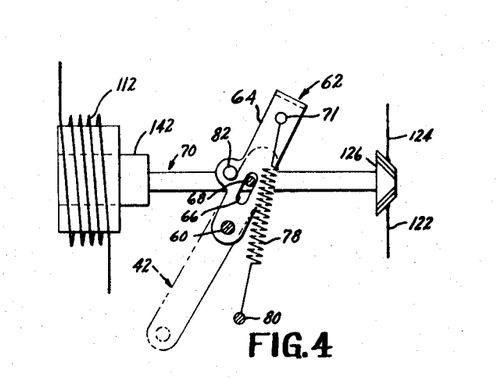
FIGURE 4 is a partially diagrammatical side elevational view of the magnetically operable current overload assembly and the contact-carrying member of FIGURE 1 in the on position of the circuit breaker and showing the lower link of the toggle linkage in phantom line.
Figures 5, 6:
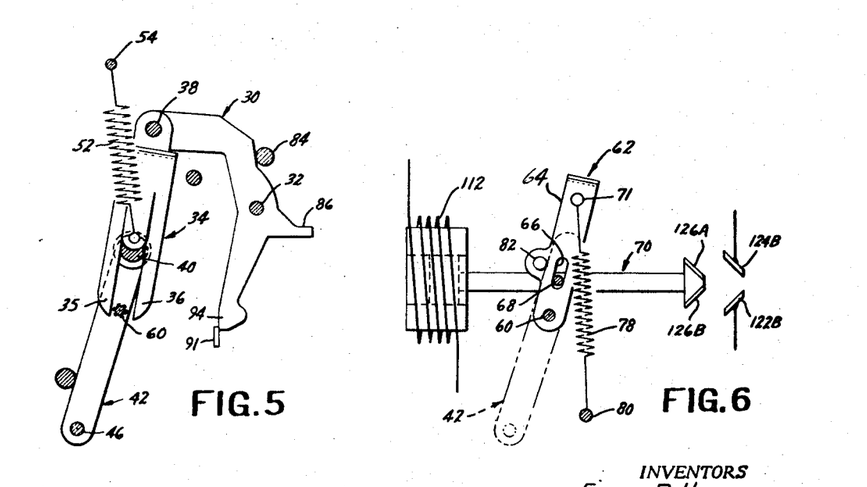
FIGURE 5 is a view similar to FIGURE 3 with the parts being shown in the off position of the circuit breaker.
FIGURE 6 is a view similar to FIGURE 4 with the parts being shown in the off position of the circuit breaker.
Figure 7:
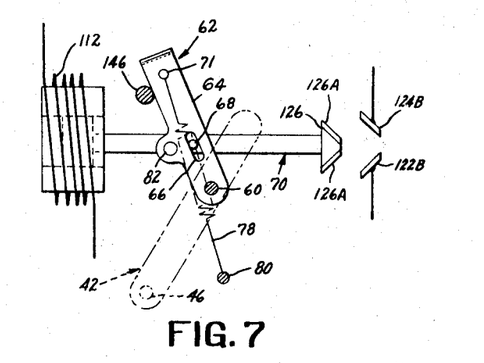
FIGURE 7 is a view similar to FIGURE 4 with the parts shown in the magnetically tripped position of the circuit breaker.

When a sudden large overflow current flows through the solenoid 112, the solenoid armature 142 and the operating rod 70 are thereby magnetically moved to the left as viewed in FIGURE 4 causing the magnetically operable link 62 to rotate on the pivot pin 60 on the lower toggle links 42. As the link 62 is rotated in the counterclockwise direction as viewed in FIGURE 7, the line of action of the springs 78 is moved across pivot pin 60 biasing the link 66 into the magnetically tripped position illustrated in FIGURE 7 where it abuts against a bar 146 mounted on the support members 23 and 24. As the link 66 is rotated, it slidable engages the operating rod 70 through the pins 68 to move it from the "on" position illustrated in FIGURE 4 to the magnetically tripped position illustrated in FIGURE 7 without effecting any corresponding movement of the main toggle links 34 and 42. The tension of the springs 78 retains the magnetically operable link 62 in the magnetically tripped position until reset by appropriate means (not shown).

In the embodiment of this invention illustrated partially diagrammatically in FIGURES 10–15, a cradle generally designated by the numeral 150 is pivoted on the shaft 152 which is mounted on support members (not shown) similar to the support members 22 and 24 of FIGURES 1–9. The cradle 150 has an extended portion 154 which is engaged by the releasable latch 156 which is actuated by a bimetallic strip (not shown) in a manner similar to the operation of the bimetallic strip 100 and releasable latch 90 in the previous embodiment. The bar 158 is supported by a manual operating member (not shown) and engages a shoulder portion of cradle 150 for resetting the cradle 150 after the releasable member 156 has been actuated. Upper toggle links 160 are pivoted on the end portion 161 of the cradle 150 by means of the pivot pins 162 and biased by tension springs 164 which are attached to the end of the toggle links 160 by the pins 166 opposite to the end having the pivot pins 162. The springs 164 are attached at their other end to a rod 168 which is mounted on a manual operating member (not shown).

In this embodiment, intermediate connecting links 170 are pivoted to the upper toggle links 160 by means of pivot pins 172 adjacent the spring mounting pins 166 and are connected to generally L-shaped lower toggle links 174 by means of pivot pins 176. At their lower ends, the toggle links 174 are pivoted on a shaft 178 which extends between the support members (not shown) 22 and at their opposite ends, the links 174 have a shoulder portion 180. The rotation of the lower link 174 about the shaft 178 is limited in the counterclockwise direction, as viewed in FIGURE 10, by the bar 181 which is mounted between the support members (not shown).

A U-shaped magnetically operable link 182 is pivoted on the lower links 174 near its center portion by means of a pivot pin 184, and tension springs 186 operate between the lugs 187 on the upper portion of link 182 and the lug 188 on the lower links 174 near the pivot pins 178. In this manner, the link 182 is biased into engagement with the shoulder portions 180 of the toggle links 174. The rotation of the link 182 about the pivot pin 184 is limited in the counterclockwise direction, as viewed in FIGURE 13, by a bar 189 which is mounted between the support members (not shown). The upper toggle links 160, intermediate toggle links 170 and lower toggle links 174 are biased by the operating springs 164 and a main toggle linkage for operating the circuit breaker device in a manner similar to that of the previous embodiment.

The link 182 has elongated slots 190 which have a pin 192 slidably disposed therein which is connected to the operating rod 194 carrying the movable bridging contact 196 which cooperates with the stationary contacts 198 and 200. On the opposite end of the operating rod 70, an armature 202 is provided and disposed within the solenoid 204.

Figure 10:
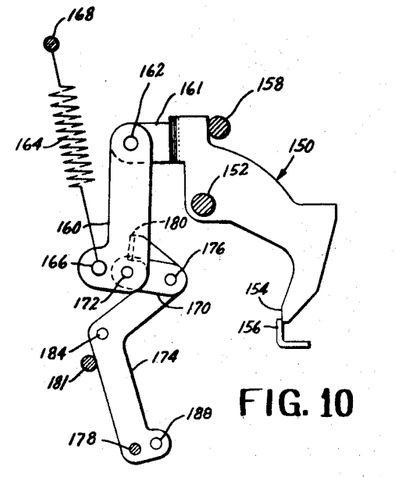
FIGURE 10 is a view similar to FIGURE 3 of another embodiment of the invention with the parts shown in the off position.
Figure 11:
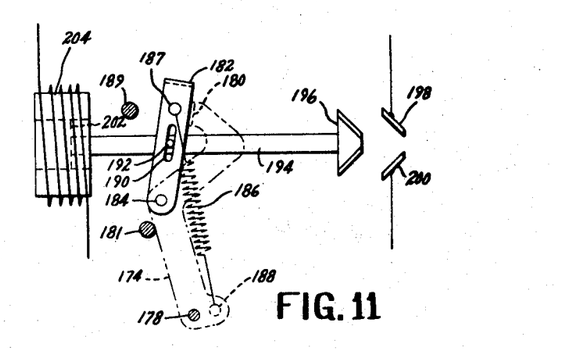
FIGURE 11 is a view similar to FIGURE 4 of the embodiment of the invention shown in FIGURE 10 with the parts shown in the off position.
Figure 12:
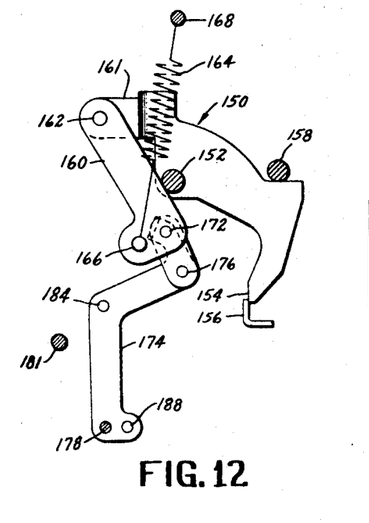
FIGURE 12 is a view similar to FIGURE 10 with the parts shown in the on position.
Figure 13:
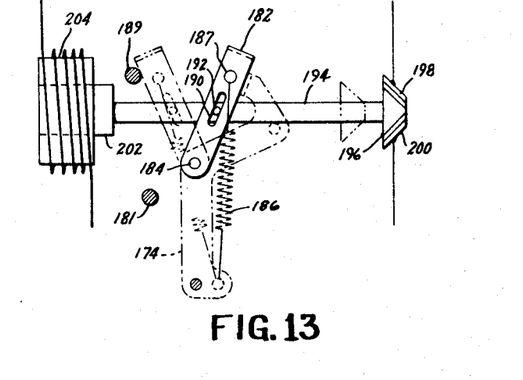
FIGURE 13 is a view similar to FIGURE 11 with the parts shown in the on position in full line and shown in the magnetically tripped position in phantom line.

When the circuit breaker is moved from the "off" or "open" position shown in FIGURES 10 and 11 to the "closed" or "on" position shown in FIGURE 12 and in full line in FIGURE 13, by pivoting the operating member (not shown) the bar 168 is moved so that the line of action of the springs 164 is moved across the pivot pins 162 whereby the toggle link 160 is rotated in a counterclockwise direction. The toggle linkage is then buckled from the position shown in FIGURE 10 to the position shown in FIGURE 12. As the lower toggle links 174 are rotated in the clockwise direction by the movement of the upper toggle links 160 and intermediate toggle links 170, the springs 186 bias the magnetically operable link 182 against the shoulder portion 180 so that the link 182 rotates in a clockwise direction as viewed in FIGURE 11. During this rotation, the operating rod 194 and the movable contact 196 are moved to the closed position illustrated in FIGURE 13. When it is desired to manually open the circuit breaker, the operating member (not shown) is rotated so that the bar 168 reverses the action just described above and the operating rod 194 and the movable contact 196 are moved into the open position.

Figure 14:
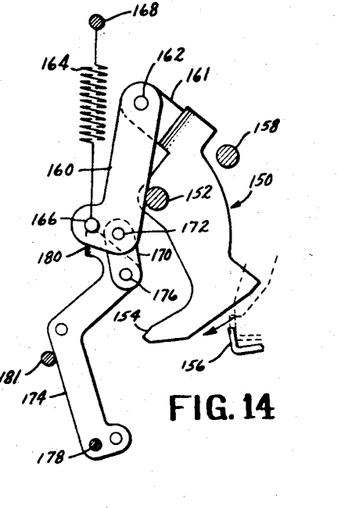
FIGURE 14 is a view similar to FIGURE 10 with the parts shown in the thermally tripped position.
Figure 15:
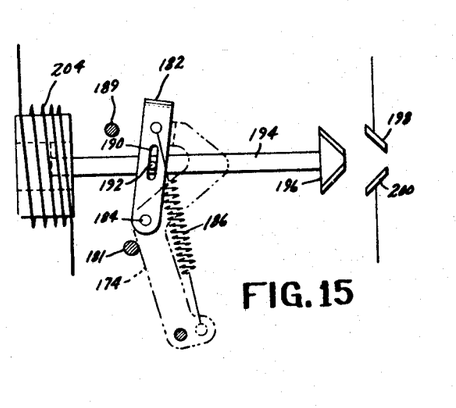
FIGURE 15 is a view similar to FIGURE 11 with the parts shown in the open position.

When the circuit breaker is in the closed position and the releasable latch 156 is actuated by an associated bimetallic strip (not shown) due to relatively small, continuous overload current, the cradle 150 is released and rotates in a clockwise direction as viewed in FIGURE 14 and carries the pivot pin 162 across the line of action of the springs 164, and the main toggle linkage is buckled from the position shown in FIGURE 12 to the position shown in FIGURE 14. This movement of the main toggle linkage moves the magnetically operable link 182 and the operating rod 194 and the movable contact 196 to the open position shown in FIGURE 11.

When the circuit breaker is in the "on" position shown in full line in FIGURE 13 and a sudden relatively large short circuit current occurs, the solenoid 204 is energized and pulls the armature 202 to the left so that the magnetically operable link 182 is rotated on the pivot pin 184 since it is slidably engaged with the operated rod 194 by the pin 192. Thus, the circuit breaker may be automatically operated from the "closed" to the "open" position upon the occurrence of a sudden large short circuit current without a corresponding movement of the main toggle linkage and the manual operating member.

The intermediate connecting links 170 function to prevent the main toggle linkage from being collapsed in the opening direction by the action of solenoid 204 when it pivots the magnetically operable link 182 into the magnetically tripped position shown in phantom line in FIGURE 13. As illustrated in FIGURE 12, the pivot pins 172 connecting the intermediate toggle links 170 to the upper toggle links 160 are slightly to the right of a centerline between the pivot pins 176 and 162. Accordingly, when the force exerted by the magnetically operable link 182 in pivoting to the magnetically tripped position tends to rotate the lower links 174 in a counterclockwise direction tending to buckle the toggle linkage to the "open" position as viewed in FIGURE 12, the intermediate links 170 tend to move upwardly and rotate in a clockwise direction about the pivot pin 172. The upward and clockwise rotation of the intermediate links 170 tend to rotate the upper links 160 in a counterclockwise direction. However, the shaft 152 upon which the cradle 150 is rotated acts as a stop to prevent counterclockwise rotation of the upper links 160 beyond the position illustrated in FIGURE 12. Thus, the toggle linkage is positively prevented from being collapsed to the "open" position when the mechanism is magnetically tripped by a sudden large overload current.

Figure 16:
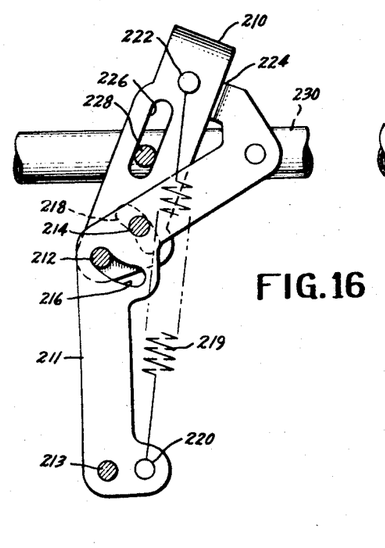
FIGURE 16 fragmentarily illustrates another embodiment of this invention with a magnetic link and a lower toggle link and associated parts in the on position.
Figure 17:
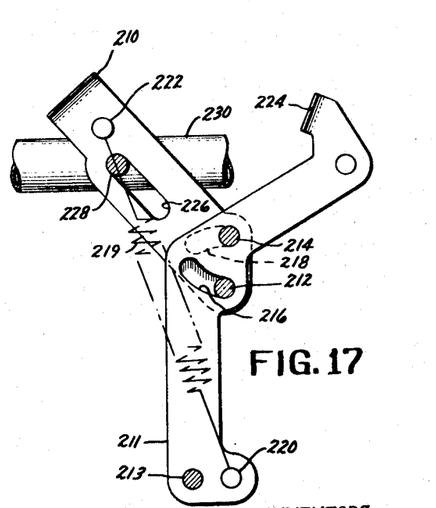
FIGURE 17 is a view of the embodiment of FIGURE 16 with the parts shown in the magnetically tripped position.

Another embodiment of this invention is shown in FIGURES 16 and 17 wherein a U-shaped magnetically operable link 210 is slidably mounted on lower toggle links 211 of a main toggle linkage by means of pivot pins 212 on the magnetically operable link 210 and the pivot pins 214 on the lower toggle links 211. Pivot pins 212 are disposed in arcuate slots 216 in the lower links 211 and pivot pins 214 are disposed in a similar arcuate slot 218 in link 210. Tensions spring 219 are connected by the lugs 220 to one end of the lower toggle links 211 and to the lugs 222 on the magnetically operable link 210 so as to bias the link 210 into engagement with a shoulder portion 224 on the lower toggle links 211. The magnetically operable link 210 has elongated slots 226 which receive the pin 228 attached to the operating rod 230. The lower toggle links 211 are pivoted on a shaft 213 mounted on support members (not shown).

When the operating rod 230 is in the "closed" or "on" position as illustrated in FIGURE 16, the magnetically operable link 210 is slidable on the pivot pins 212 and 124 and is movable in a counterclockwise direction to the position shown in FIGURE 17 upon the activation of an armature (not shown) on the operating rod 230 by an associated solenoid (not shown) which moves the operating rod 230 to the left to the magnetically tripped position illustrated in FIGURE 17. As magnetic link 210 passes into an upright position and as the line of action of the tension springs 219 pass over the pivot pins 212 and 214, the link 210 and the operating rod 230 are biased into the "open" position when the magnetically operable link 210 reaches in the position illustrated in FIGURE 17. The pins 212 and 214 slide relatively freely in the arcuate slots 216 and 218 in comparison with the amount of friction and resistance that would normally occur if the link 210 were merely rotated on a single pivot pin as illustrated in the embodiment shown in FIGURE 11. Thus, the reduced resistance makes it possible for a solenoid to rapidly move an operating rod 230 from the closed to the open position with a minimum amount of force and enhances the operation of the circuit breaker. This pivotal mounting may be utilized with the two types of toggle linkages described hereinbefore.

Thus, it can be seen that, in each of the several illustrated embodiments, the magnetically operable biasing means for moving the operating rod is operable to open the contacts without moving the main toggle linkage. The biasing means also functions to maintain contact pressure in the closed circuit position and function as the connection between the main toggle linkage and the operating rod. In this manner, operation of the toggle linkage manually or by an automatic operator such as a bimetal strip produces rapid movement of the operating rod into or out of the fixed contact through the biasing means, and the current overload operating means associated including the biasing means rapidly effects breaking of the contact without releasing the main toggle linkage. The structure is subject to variation in design to provide a relatively compact and economical but highly effective circuit breaker assembly which is relatively rugged in construction and relatively simple to fabricate.

While the invention has been described only in the particular form set forth herein, it will be appreciated that many modifications thereof may be made without departing from the spirit of the invention. We therefore intend, by the appended claims to cover all modifications as fall within the true spirit and scope of the invention.

What we claim as new and desire to secure by Letters Patent of the United States is:

1. A current-limiting electric circuit breaker comprising:
   (a) a support;
   (b) arc interrupting means supported on said support, said arc interrupting means comprising at least one pair of separable contacts supported on said support and arc extinguishing means supported on said support, said contacts and said arc extinguishing means being positioned closely adjacent each other;

(c) operating mechanism for said contacts, said operating mechanism comprising manually operable means for moving said contacts between open and closed circuit positions and automatically operable means for moving said contacts from said closed to said open circuit positions;

(d) current-responsive trip means for causing opening action of said automatically operable means of said operating mechanisms;

(e) high speed current-responsive opening means for causing opening of said contacts independently of said operating mechanism;

(f) said circuit breaker being constructed and arranged with said arc interrupting means, said trip means, said operating mechanism and said high speed opening means disposed in sequential relation on said support in the recited order.

2. A current-limiting circuit breaker as set forth in claim 1 wherein said trip means comprises an elongated bimetallic strip and means for heating said bimetallic strip in response to current in said circuit breaker, and wherein said high speed opening means comprises a solenoid and means connecting said solenoid electrically in series with said contacts.

3. A current-limiting circuit breaker as set forth in claim 1 wherein said circuit breaker also comprises:

(a) an operating rod and means connecting said operating rod to at least one of said separable contacts for movement of said contact between open and closed circuit position in response to movement of said rod;

(b) means connecting said operating mechanism to said rod to operate said rod between said open and closed circuit positions in response to movement of said operating mechanism, and (c) means connecting said high speed opening means to said rod to cause opening movement of said contacts upon energization of said solenoid, said means connecting said solenoid to said rod being effective to cause opening movement of said rod and said contacts despite the retention of said operating mechanism in said closed circuit position.

4. A current-limiting circuit breaker as set forth in claim 3 wherein said operating rod extends from said contact and arc chute unit through said operating mechanism to said solenoid.

5. A curent-limiting circuit breaker as set forth in claim 1 wherein said operating mechanism includes a single operating spring for causing movement of said contacts upon manual operation of said operating mechanism and for causing opening movement of said contacts upon automatic operation of said operating mechanism.

References Cited

UNITED STATES PATENTS

| | | | |
|---|---|---|---|
| 2,939,936 | 6/1960 | Deans | 200—116 |
| 3,012,118 | 12/1961 | Edmunds | 335—16 |
| 3,043,934 | 7/1962 | Bodenschatz | 200—116 |

BERNARD A. GILHEANY, *Primary Examiner.*

H. BROOME, *Assistant Examiner.*